J. M. JOANNIDES.
Apparatus for Protecting Grain and Seed.
No. 136,437.                    Patented March 4, 1873.
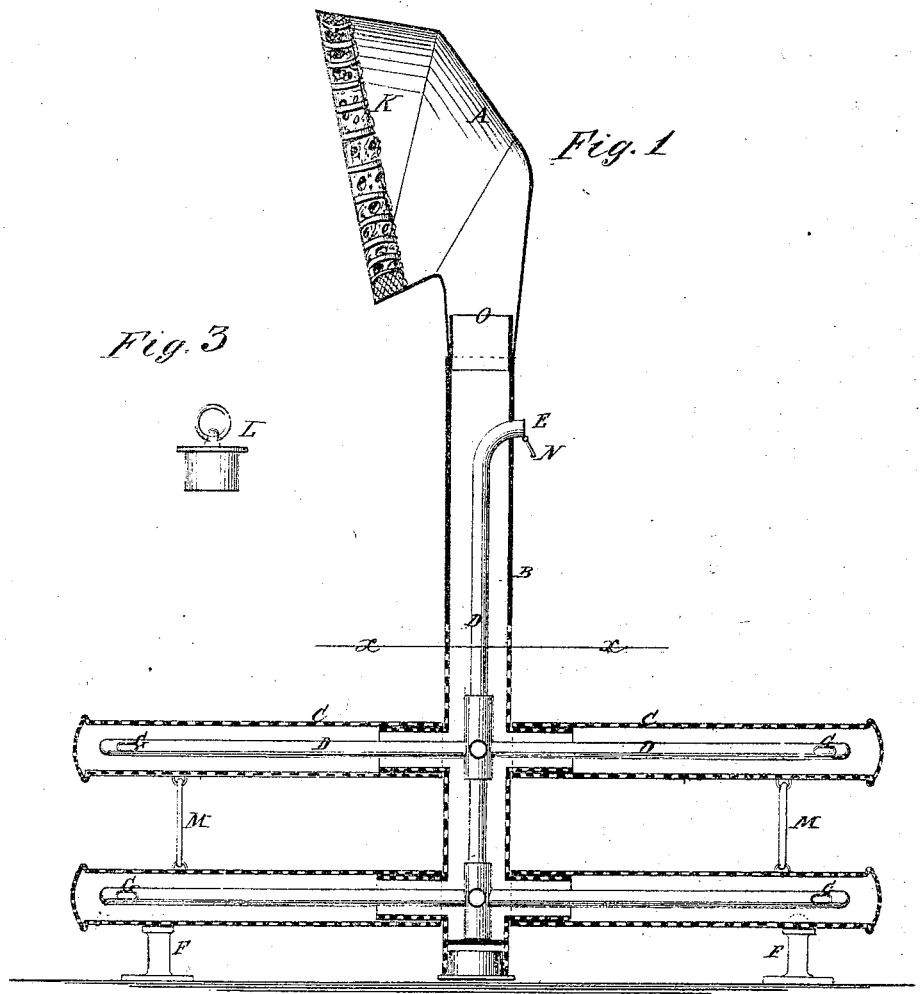
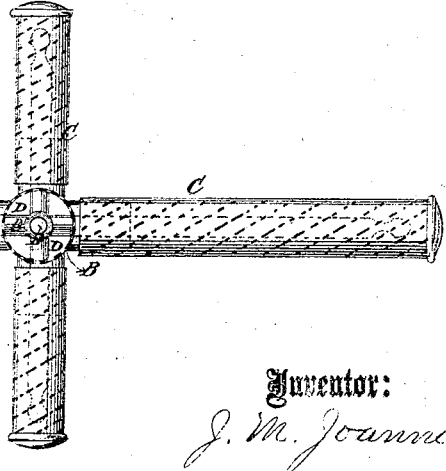
Witnesses:
A. W. Almqvist
Geo. W. Mabee
Inventor:
J. M. Joannides
per Munn & Co.
Attorneys.

UNITED STATES PATENT OFFICE.

JEAN METHODIOS JOANNIDES, OF MARK LANE, LONDON, ENGLAND.

IMPROVEMENT IN APPARATUS FOR PROTECTING GRAIN AND SEED.

Specification forming part of Letters Patent No. 136,437, dated March 4, 1873.

*To all whom it may concern:*

Be it known that I, JEAN METHODIOS JOANNIDES, of Mark Lane, in the city of London, England, have invented a new and Improved Anti-Mildew Grain and Seed Protector, of which the following is a specification:

This invention has for its object to prevent the mildew and rotting of seed or grain of all kinds, and other things, during the period of being stored on board ships, or in other positions or places; and this by an apparatus so arranged that fresh atmospheric air is conducted into and about the mass of seed or grain thus stored. The apparatus consists of a perpendicular cylinder of metal, wood, or other suitable material, with eight—more or less—horizontal cylinders or pipes of like material, all connected with and branching from the perpendicular cylinder. The said cylinders, both perpendicular and horizontal, are perforated with small holes for the circulation of the air, but so as not to allow of the grain, seeds, or other things passing through. A series of small tubes are placed in the insides of the large ones for the return of the confined air and to keep up the circulation.

The apparatus thus formed is placed in the compartment of the ship, or where the grain or seed may be stored, but is not a fixture of the storage-chamber. The perpendicular cylinder, projecting above into the open air, has attached to it a funnel-mouthed ventilator fitted with sponges chemically prepared for purifying the air before its admission into the cylinder. Thus fresh atmospheric air is introduced down the perpendicular into the horizontal cylinders, the air passing through small perforated holes into and generally about the seed, grain, or other things that may be stored, and by this means it is and has been found to secure the object in view.

To more fully explain the invention reference is made to the accompanying drawing.

Figure 1 is a vertical section, showing the arrangement of pipes for circulation of air. Fig. 2 is a horizontal section on the line $x\ x$ of Fig. 1. Fig. 3 is a cap for the vertical pipe.

Similar letters of reference indicate corresponding parts.

A is a funnel-shaped ventilator; B, a perpendicular cylinder with small holes or perforations; C, horizontal cylinder with same; D, interior pipes for keeping up the circulation; E, mouth or opening of pipes D; F, standards for supporting lower horizontal cylinders and apparatus generally; G, inner openings of pipes D; K, sponges chemically prepared for purifying the air as it passes into the cylinders; L, a movable cap for the top O of the upright cylinders in stormy weather, when the ventilator A can be removed; M, supports for the upper horizontal pipes; N, hinged cover to the mouth E of the interior pipes D.

This apparatus is placed in the bin, hold, or other compartment for storing grain before the grain is put in, with the tube B extending up through the deck, in case the said compartment is a hold of a vessel, and thus introduces fresh air and conveys away the foul air for the preservation of the grain.

The apparatus may be used without the tubes D with good results in case the deck will admit of the escape of the foul air rising up from the grain.

The sponges above alluded to may be chemically prepared by dipping them in a solution of carbolic acid, potash, or other purifying material.

Having thus described my invention, I claim as new and desire to secure by Letters Patent—

The combination, with the ventilator A and perforated tubes C, of chemically-prepared sponges, substantially as specified.

The above specification signed by me this 18th day of October, 1871.

JEAN METHODIOS JOANNIDES. [L. S.]

Witnesses:
R. MARSDEN LATHAM,
21 *Cockspur street, Charing Cross, London.*
THOMAS MORGAN,
21 *Cockspur street, Charing Cross, London.*